(12) United States Patent
Teofili et al.

(10) Patent No.: US 11,163,831 B2
(45) Date of Patent: Nov. 2, 2021

(54) ORGANIZING HIERARCHICAL DATA FOR IMPROVED DATA LOCALITY

(71) Applicant: Adobe Inc., San Jose, CA (US)

(72) Inventors: Tommaso Teofili, Rome (IT); Antonio Sanso, Duggingen (CH)

(73) Assignee: ADOBE INC., San Jose, CA (US)

(*) Notice: Subject to any disclaimer, the term of this patent is extended or adjusted under 35 U.S.C. 154(b) by 380 days.

(21) Appl. No.: 16/267,001

(22) Filed: Feb. 4, 2019

(65) Prior Publication Data

US 2020/0250234 A1    Aug. 6, 2020

(51) Int. Cl.
  *G06F 16/901*  (2019.01)
  *G06K 9/62*   (2006.01)
  *G06F 16/903*  (2019.01)
  *G06F 16/185*  (2019.01)

(52) U.S. Cl.
  CPC ........ *G06F 16/9027* (2019.01); *G06F 16/185* (2019.01); *G06F 16/90335* (2019.01); *G06K 9/6276* (2013.01)

(58) Field of Classification Search
  None
  See application file for complete search history.

(56) References Cited

U.S. PATENT DOCUMENTS

| | | | |
|---|---|---|---|
| 10,331,753 B1 * | 6/2019 | Zhang | H04W 4/023 |
| 2015/0254280 A1 * | 9/2015 | Wang | G06F 16/532 |
| | | | 707/723 |
| 2020/0236171 A1 * | 7/2020 | Gupta | H04L 67/1097 |

OTHER PUBLICATIONS

Nickel, Maximillian, et al., "Poincaré Embeddings for Learning Hierarchical Representations", arXiv:1705.08039v2, May 26, 2017, 10 pages.
Teofili, Tommaso, "par2hier: towards vector representations for hierarchical content", Procedia Computer Science 108C, Jun. 12-14, 2017, pp. 2343-2347.

* cited by examiner

*Primary Examiner* — Scott A. Waldron
(74) *Attorney, Agent, or Firm* — F. Chau & Associates, LLC

(57) ABSTRACT

A computer system generates a similarity-optimized hierarchy for hierarchical data to improve data access performance and content discovery. An example method includes receiving hierarchical data in an original hierarchy having a plurality of nodes and a depth of d, generating a respective embedding for each node of the plurality of nodes, and determining, for each node of the plurality of nodes, respective k-nearest neighbors based on the respective embedding. Starting with nodes at depth d in the original hierarchy, the method includes generating sibling groups, each sibling group having at least one node at depth d, identifying, for each node at depth d, a similarity-optimized parent from depth d−1, and associating each node at depth d with its respective similarity-optimized parent in a similarity-optimized hierarchy. The method also includes completing the similarity-optimized hierarchy by repeating the generating, identifying and associating with nodes at depth d−1 until reaching the hierarchy root.

19 Claims, 6 Drawing Sheets

ORGANIZING HIERARCHICAL DATA FOR IMPROVED DATA LOCALITY

TECHNICAL FIELD

This description relates to improving read performance for hierarchical data. More specifically, the description relates to a method for organizing hierarchical data based embedding similarities to optimize data access patterns.

BACKGROUND

Data, especially text data, are often organized in a hierarchical manner. Hierarchical data is organized in the form of nodes connected by edges, also referred to as arcs. The nodes of a hierarchy are organized into levels. A hierarchy has a root node. The root node represents a highest level of the hierarchy. The root node has children, which are a level below the root node. The children of a root node are often said to be at depth of one or in the $1^{st}$ level. Similarly, children of the nodes at the level below the root node are often said to be at a depth of two or in the $2^{nd}$ level. Hierarchical data is often referred to as a tree. Web pages represent one example of hierarchical organization, with a home page as a root node, pages linked from the home page as first level pages (nodes), pages linked from a first level page as second level pages (nodes), etc. This hierarchy may be written as home page→first level pages→second level pages, etc. As another example, research articles or books can be organized in chapters→sections→subsections, etc. Text written in natural language can also be organized hierarchically, e.g., document→paragraphs→sentences-→noun phrases/verb phrases→nouns/verbs/adjectives. Hierarchical data is not limited to text and can be any data stored in a directed acyclic graph.

Hierarchical data can be physically stored in various ways. Data structures and storage systems for hierarchical data are generally optimized for I/O throughput and the amount of storage required. Browsing hierarchical data, e.g., via a content management system, typically involves knowing where to find content with respect to a certain information need. The absence of such knowledge often leads to an inefficient search of distant subtrees, where distance is the number of arcs (edges) traversed to reach a node T from a node S.

SUMMARY

Implementations include a data storage system that organizes hierarchical data by node similarity, so that closely related nodes are siblings in the hierarchy. Some implementations physically store the nodes according to this organization, so that similar nodes are physically stored near each other in memory. Storing nodes by relatedness improves the operation of a computer system that frequently accesses related nodes close in time. The improvements arise from reduced resources, e.g., memory accesses, needed to access related content when such access occurs close in time. For example, search results related to a certain query are typically read or retrieved together. Even if not physically stored according to the similarity-optimized organization, the similarity-optimized hierarchy generated by disclosed implementations facilitates user discovery of related nodes when navigating the hierarchy. For example, a user can easily find related content by exploring any subtree in the similarity-optimized hierarchy, as similar nodes are siblings in such a hierarchy. Implementations generate the similarity-optimized hierarchy by grouping nodes into sibling groups based on similarity measures. Starting at the bottom of the hierarchy (depth d) and working toward the root, implementations assign nodes at each level to a similar node in the parent level. The selection of the parent is influenced by the sibling groups.

The details of one or more implementations are set forth in the accompanying drawings and the description below. Other features will be apparent from the description and drawings, and from the claims.

DETAILED DESCRIPTION

Figure 1:
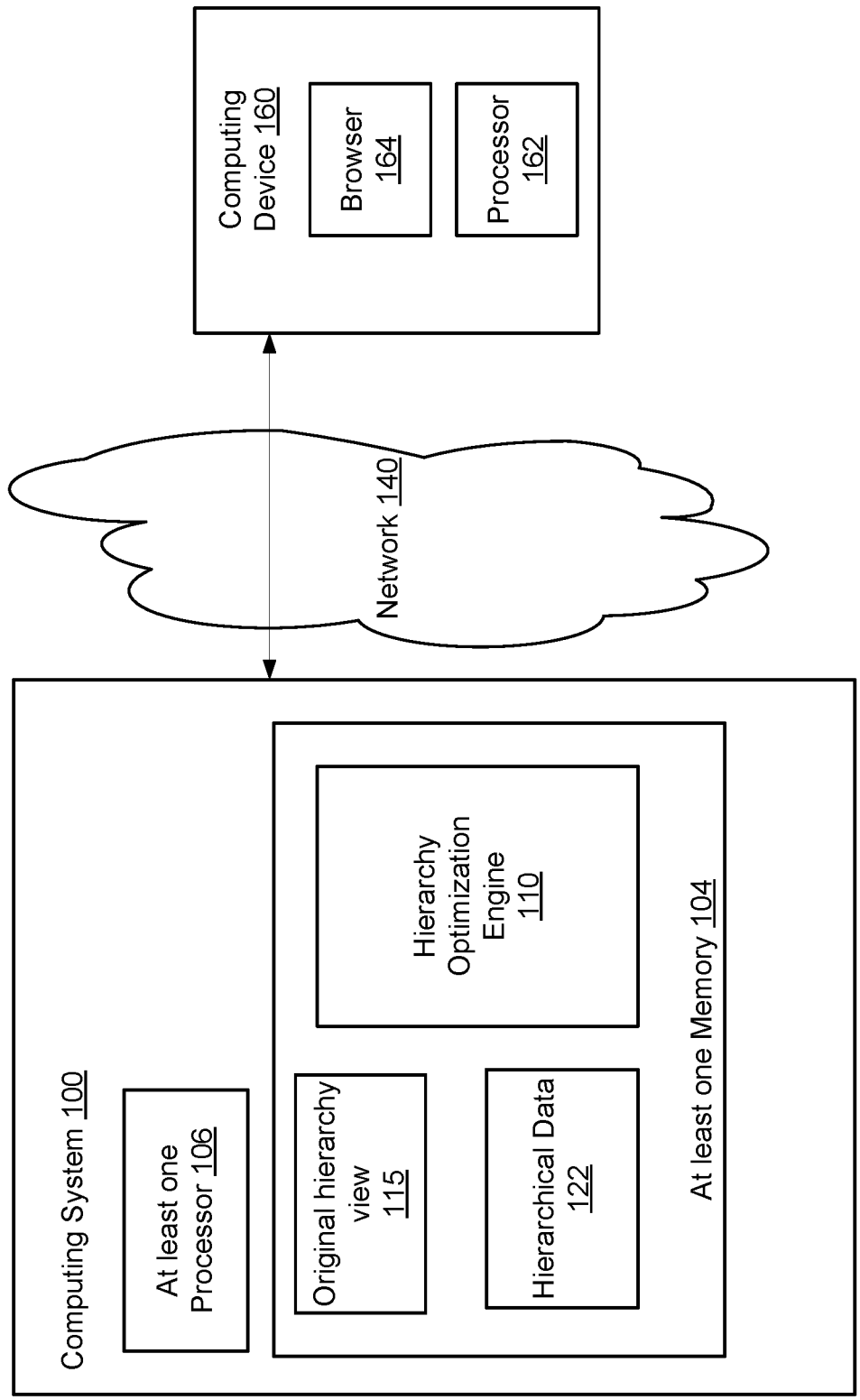
FIG. 1 is a block diagram of a computing system that organizes hierarchical data according to node relatedness, according to an implementation.

Implementations organize hierarchical data based on likely data access patterns to facilitate user discovery of related data and improve computer performance. Data locality refers to the likelihood that two similar data items will be accessed close in time. Implementations improve computer performance by organizing hierarchical data according to data locality. In particular, implementations encode the nodes of a hierarchy as embeddings so that relatedness can be determined. An embedding is generated for each of the nodes of the hierarchy. Disclosed implementations use the embeddings to find the top k nearest neighbors of each node. Beginning with the nodes at the lowest level (at depth d) of the hierarchy, disclosed implementations use the top k nearest neighbors to form sibling groups. From the sibling groups, the nodes select a parent from the nodes at level above (at depth d−1). This process proceeds recursively until the root node is reached. The resulting reorganization groups nodes according to similarity.

In some implementations, the system may store the nodes according to the reorganized hierarchy to take advantage of data locality. Data locality represents a data access pattern where certain data is often read at the same time/close in time. For example, in a search system, nodes responsive to a particular query are read at the same time. Storing such nodes in close proximity in physical memory reduces the system resources (e.g., bytes read, number of accesses) consumed in response to a query. In some implementations, a user may use the similarity-optimized hierarchy for navigation to discover related content. In the original hierarchy such similar content may be in distant subtrees of the hierarchy, forcing the user to navigate several levels. In the similarity-optimized hierarchy related data items are organized as siblings in the same subtree, making discovery simple and with fewer navigation steps.

As used herein, hierarchical data refers to any data that can be organized in an acyclic directed graph, i.e., a tree. An element of data is referred to as a node. Nodes are organized into the hierarchy. In a hierarchy, one node is referred to as the root node. The root node is at level zero (0) in the hierarchy. The remaining data elements (nodes) are organized under the root node in subtrees. A root node has no parent nodes. Parent nodes are nodes one level above a node. A root node has at least one child. A leaf node in the hierarchy has no children (e.g., no nodes below it in the hierarchy) but has a parent node. A parent node is connected to a child node via an arc or path. As used herein, path length refers to the number of arc between any two nodes in the hierarchy. As used herein, depth refers to the path length between a node and the root node. A node with a depth of one (1) is also said to be in the first level. A node with a depth of two (2) can also be referred to a node in the second level, two levels below the root node, at depth two, etc. In some hierarchies, all leaf nodes are at the same depth. In some hierarchies, leaf nodes are at different depths. Although relative terms like "below" and "under" are used for ease of discussion, these terms are understood represent similar depth relationships in a horizontal hierarchy. A branching factor refers to the number of children of a node. A hierarchy also has an effective branching factor that represents the average/typical branching factor of the nodes in the hierarchy.

As used herein, a similarity-optimized hierarchy is a reorganization of an original hierarchy so that nodes that are most similar to each other are siblings in the hierarchy. A similarity-optimized hierarchy does not change the depth of any nodes, but may change the subtree a node appears in. A similarity-optimized hierarchy reflected in the persistence layer of a computer achieves better data locality. As used herein, the persistence layer of a computer represents physical memory.

As used herein, an embedding is a mathematical representation of a data item, such as a node in hierarchical data. Embeddings are used to measure similarity between any two data items. The mathematical representation is typically an array of numbers. The array may be one dimensional or multidimensional. Each position in the array represents an aspect of the data item. Each position of the array is referred to as a dimension. The number of dimensions depends on the data item modeled. As a simple example, a model of a document may have one array position for each possible word in the document. The value of the position may represent the frequency that a particular word/term appears in the document. Such embeddings have high dimensionality because the number of possible words is high. Such embeddings are sparsely populated however, because a particular document has relatively few array positions with a non-zero value. As another example, an embedding can represent topics (e.g., film genres/subgenres, book classifications) and the value of a particular position in the array can represent a user's interest in the topic. The value of a dimension may be an integer, but is often represented by a floating point number, e.g., on a scale from 0.0 to 1.0. Embeddings have conventionally been represented in Euclidean space. Euclidean geometry studies spaces of no curvature. Examples of conventional embeddings in Euclidean space are word2vec, GloVe, bag-of-words, FastText, node2vec, DeepWalk, Rescal, Trans, etc.

The embedding of nodes in a hierarchical dataset may be an embedding in hyperbolic geometry. Hyperbolic geometry is a non-Euclidean geometry which studies spaces of constant negative curvature. Hyperbolic space is a space with constant negative curvature. Embeddings in hyperbolic space naturally model hierarchical structures because a node's depth is approximated in the embedding. Thus, Hyperbolic geometry embeddings model the hierarchy in the embedding in addition to the node content. Examples of embeddings in hyperbolic space are described in Nickel et al., "Poincaré Embeddings for Learning Hierarchical Representations," arXiv:1705.08039v2, 26 May 2017, (incorporated herein by reference) and other similar approaches, such as par2hier, described in Teofili, "par2hier: towards vector representations for hierarchical content," International Conference on Computational Science, ICCS 2017, 14 Jun. 2017, pp. 2343-2347, (incorporated herein by reference). For hierarchical data, hyperbolic embeddings result in more accuracy in similarity metrics than embeddings in Euclidean geometry, although Euclidean embeddings can also be used in some implementations.

As used herein, k-nearest neighbors of a node refer to, for a current node, k other nodes in the hierarchy most similar to the current node. Similarity is based on the embeddings of the nodes. K is any integer greater than zero. In some scenarios, all nodes in the hierarchy may be considered as potential neighbors. In some scenarios, only certain nodes, e.g., nodes one level above the current node, may be considered as potential neighbors. The k top-scoring potential neighbors are selected as the k-nearest neighbors. The similarity metric used to score the k-nearest neighbors can be one of a number of known or later discovered similarity measures. Examples of similarity metrics include clustering, index of intra-document similarity, Euclidean distance, Word mover distance, etc. In some implementations, the k-nearest neighbors may be selected based on a combination of two or more similarity metrics.

As used herein, a sibling group is a group of nodes in the hierarchy that are mutual k-nearest neighbors. Two nodes A and B are mutual k-nearest neighbors if A is in the k-nearest neighbors of B and B is in the k-nearest neighbors of A. Two nodes X and Y are also mutual k-nearest neighbors if X is the nearest neighbor to Y even though Y is not in the k-nearest neighbors of X In other words, if X is the top-scoring node in the k-nearest neighbors of Y, Y will be in X's sibling group.

As used herein, a similarity-optimized parent of a current node at depth d is a node at depth d−1 in the hierarchy that is similar to the current node and at least one other node at depth d in the sibling group of the current node. If the current node is the only node in the sibling group at depth d, the similarity-optimized parent is the node at depth d−1 most similar to the current node.

As used herein, a view is a logical view of the hierarchical data. A logical view can be independent of how the data is stored in the persistence layer. In other words, the view may reflect the organization of the data in the persistence layer or the view can reflect a different organization.

Details of the systems and techniques are discussed below with respect to the illustrated figures. FIG. 1 is a block diagram of a computing system 100 that organizes hierarchical data according to similarity, according to an implementation. The system 100 includes at least one memory 104, at least one processor 106, an operating system (not shown), and one or more modules, such as hierarchy optimization engine 110. The system 100 may communicate with one or more other computing devices, e.g., computing device 160, over a network 140, e.g., the Internet, an intranet, a cellular network, etc. The system 100 may be implemented as a server, a desktop computer, a laptop computer, a mobile device such as a tablet device or mobile phone device, as well as other types of computing devices. The computing system 100 can be a single computing device or multiple computing devices in communication with one another, such as multiple servers cooperating with one another to perform one or more functions over a network, such as network 140. The computing system 100 may thus be a distributed system. The hierarchy optimization engine 110 may operate on a single computing device or on a distributed computing system.

The at least one processor 106 may represent a single processor or two or more processors on the computing system 100 executing in parallel. The at least one processor 106 may execute instructions stored using the at least one memory 104. In some implementations, the at least one processor 106 may be a specialized processor, e.g. a graphics processing unit (GPU). The at least one memory 104 represents a non-transitory computer-readable storage medium. The at least one memory 104 may represent one or more different types of memory utilized by the computing system 100. The at least one memory 104 may be cache. The at least one memory 104 may be disc memory. The at least one memory may be Random Access Memory. The at least one memory 104 may store instructions that allow the at least one processor 106 to implement disclosed embodiments. The at least one memory 104 may store data, such as one or more of the hierarchical data 122, an original hierarchy view 115, and/or a similarity optimized hierarchy view. The original hierarchy view 115 may be stored if the similarity optimized hierarchy is reflected in the persistence layer. The similarity optimized hierarchy view may be stored if the similarity optimized hierarchy is not reflected in the persistence layer. The at least one memory 104 may also be used to store processes and modules, such as hierarchy optimization engine 110, and their components. The hierarchical data 122 can be any data that can be organized in an acyclic directed graph.

The hierarchy optimization engine 110 may be configured to determine a similarity-optimized hierarchy for the hierarchical data 122. In some implementations, the hierarchy optimization engine 110 may reflect the similarity-optimized hierarchy in the persistence layer. In other words, the hierarchy optimization engine 110 may use the similarity-optimized hierarchy to rearrange the hierarchical data 122 in physical memory so that leaf nodes that are siblings in the similarity-optimized hierarchy are stored in proximity to each other. Such physical proximity can greatly reduce the quantity of read operations performed for tasks that access the hierarchical data items, such as generating a search result. In implementations that reflect the similarity-optimized hierarchy in the persistence layer, the hierarchy optimization engine 110 may be configured to optionally preserve a view of the original hierarchy, e.g., as original hierarchy view 115. In implementations that do not reflect the similarity-optimized hierarchy in the persistence layer, the hierarchy optimization engine 110 may be configured to store the similarity-optimized hierarchy as a view, so that a user can use the view to navigate the hierarchical data. Such a view inherently exists when the hierarchy is reflected in the persistence layer. The similarity-optimized hierarchy facilitates discovery of similar content through navigation of the hierarchy because nodes of semantically similar content are siblings in the hierarchical structure. In some implementations, the hierarchy optimization engine 110 may operate as a service, e.g., receiving hierarchical data 122 from computing device 160. In some such implementations, the hierarchy optimization engine 110 may provide the hierarchical data 122 back to the computing device 160 in a similarity-optimized hierarchy, e.g., arranged according to the similarity-optimized hierarchy. In some such implementations, the hierarchy optimization engine 110 may provide the similarity-optimized hierarchy to the computing device 160, e.g., provide a view implementing the similarity-optimized hierarchy.

The hierarchy optimization engine 110 determines the similarity-optimized hierarchy for hierarchical data 122 by adjusting the hierarchical structure to recursively maximize different similarity metrics. More specifically, the hierarchy optimization engine 110 may recursively, from the leaf nodes to the root node, organize nodes according to similarity. To organize the nodes, the hierarchy optimization engine 110 may group nodes into sibling groups according to similarity and select a similarity-optimized parent for each node. Once nodes at one level have been so organized the hierarchy optimization engine 110 may organize the nodes in the next-higher level. At the end of the recursion, the hierarchy optimization engine 110 has determined the similarity-optimized hierarchy. This hierarchy can then be used to change how the nodes in the hierarchical data are stored in physical memory (i.e., reflected in the persistence layer) and/or to navigate the hierarchical data 122.

In some implementations, the system 100 may be in communication with a computing device 160. The computing device 160 may include at least one processor 162 and memory storing modules and data, e.g., browser 164. The memory may represent one or more different types of memory utilized by the computing device 160. The browser 164 may represent a conventional Internet browser or a specialized program for communicating with the hierarchy optimization engine 110. For example, the computing device 160 may use the hierarchy optimization engine 110 as a service. The computing device 160 may communicate with computing system 100 over network 140. The computing device 160 may be implemented as a server, a desktop computer, a laptop computer, a mobile device such as a tablet device or mobile phone device, as well as other types of computing devices. Although a single computing device 160 is illustrated, it is understood that several computing devices may be in communication with system 100 over one or more networks 140.

Figure 2:
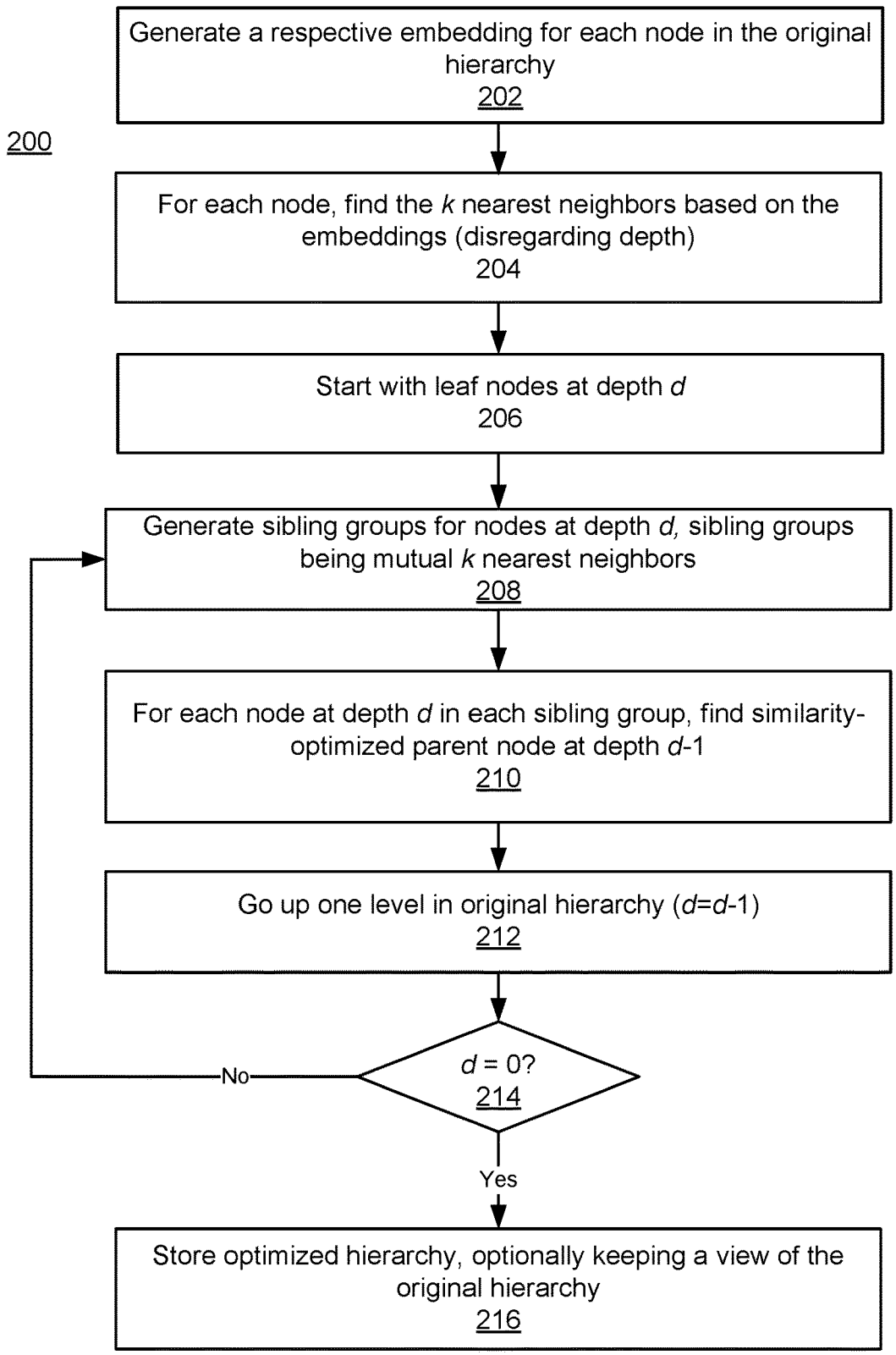
FIG. 2 is an example flowchart illustrating a process that organizes hierarchical data according to node relatedness, according to an implementation.

FIG. 2 is an example flowchart illustrating a process 200 that organizes hierarchical data according to node relatedness, according to an implementation. The process 200 may be performed by a system such as system 100 of FIG. 1. Process 200 includes an iterative process from leaf nodes to the root node to generate the similarity-optimized hierarchy for hierarchical data. Process 200 uses one or more similarity metrics to organize nodes at the same depth into sibling groups and uses the sibling groups to select a parent. Thus, process 200 builds the similarity-optimized hierarchy from the leaf nodes up to the root node. In some implementations the hierarchical data is received by the system, e.g., from a requesting process. For example, the system may be provided with a location of the hierarchical data and access the data at the location. As another example, the system may be provided with the data from the requesting process and store the data as a local copy.

Process 200 begins by generating a respective embedding for each node in the original hierarchy (202). The embeddings are encoded representations of the nodes in the hierarchy. In some implementations, the system generates embeddings in hyperbolic space. Embeddings in hyperbolic space encode not only for the content of nodes, but also the structure of the original hierarchy. Non-limiting examples of embeddings in hyperbolic space include Poincaré Embeddings, par2hier, and other similar approaches. Embeddings in hyperbolic space produce more accurate similarity metrics for hierarchical data. However, implementations may use more conventional embeddings in Euclidean space, e.g., word2vec, GloVe, bag-of-words, etc.

The system then uses the embeddings to find, for each node in the hierarchy, the k-nearest neighbors of the node (204). The k-nearest neighbors can be based on any existing or newly developed similarity metric, such as clustering, index of intra-document similarity, etc. The k-nearest neighbors are determined without regard to depth. In other words, for sibling group generation, the neighbors do not need to appear in any particular layer of the original hierarchy. Put another way, every node in the original hierarchy is a potential nearest neighbor. The value of k is any non-zero integer. In some implementations, the value of k is at least two. In some implementations, the value of k may be based on the node average outgoing degree, or in other words the effective branching factor of the original hierarchy. For example, the value of k may be equal to the effective branching factor. The value of k may also be equal to a number near the effective branching factor, e.g., one less than the effective branching factor, one more than the effective branching factor, etc. In some implementations, the value of k may be based on the number of conflicts encountered when determining sibling groups or similarity parents. For example, when the number of conflicts, or in other words the non-mutual siblings, of a node is k or greater, the value of k may be increased to reduce the conflicts.

The system begins the iterative process of generating the similarity-optimized hierarchy with the nodes at the lowest depth of the original hierarchy, e.g., at depth d (206). The system determines sibling groups for the nodes at depth d. Members of a sibling group are mutual k-nearest neighbors. Two nodes A and B are mutual k-nearest neighbors if B is included in the k-nearest neighbors of A and A is included in the k-nearest neighbors of B. If node A has node B as a k-nearest neighbor but node B does not have A as a k-nearest neighbor, A and B are still mutual k-nearest neighbors if node B is the most similar node to node A even though A is not a k-nearest neighbor to B. Put another way, if B is the highest scoring node in the k-nearest neighbors of node A, node A and node B are considered mutual nearest neighbors. The process of forming sibling groups is also illustrated in FIG. 3.

Once sibling groups are formed for nodes at depth d, the system determines the similarity-optimized parent node for each of the nodes at depth d (210). The similarity-optimized parent node is a node at depth d−1 that is similar to the nodes at depth d in the sibling group. Nodes in a sibling group do not need to all have the same similarity-optimized parent. In some implementations, the similarity-optimized parent is the node from depth d−1 most similar to the node. In some implementations, the nodes in the sibling group can influence which parent is selected, as described in more detail with regard to FIG. 4. Once all nodes at depth d in the sibling group have a similarity-optimized parent, the system goes up one level in the original hierarchy (212). If the iterative process has not yet reached the root of the hierarchy (214, No), the system repeats steps 208 to 212 with the nodes at the next-higher level, e.g., d is now d−1 from the previous iteration. Eventually, the system reaches the root node where d=0 (214, Yes). At his point the system has reorganized the hierarchy according to similarity, generating the full similarity-optimized hierarchy.

In some implementations, the system may store the nodes according to similarity-optimized hierarchy (216). This preserves the similarity-optimized hierarchy in the persistence layer and changes the way the hierarchical data is physically stored. Preserving the similarity-optimized hierarchy in the persistence layer results in improvements in data access performance and content discovery. The improvements result because the persistence layer better reflects data locality. In some implementations, the system optionally keeps a view of the original hierarchy. In some implementations, improvements in content discovery are achieved by accessing the hierarchical data using the similarity-optimized hierarchy rather than the original hierarchy. Such implementations need not reflect the hierarchy in the persistence layer. In some implementations, the system may provide the similarity-optimized hierarchy to a requesting process. In some implementations, storing the nodes according to similarity may include accessing the hierarchical data at a location provided to the system. In some implementations, storing the nodes according to similarity may include preserving the similarity-optimized hierarchy in a local copy of the hierarchical data and providing the local copy to a requesting process. Process 200 ends, having organized the hierarchical data to optimize node similarity. In some implementations the system may repeat process 200 after a certain number of nodes are added to or deleted from the hierarchy and/or after a period of time has elapsed.

Figure 3:
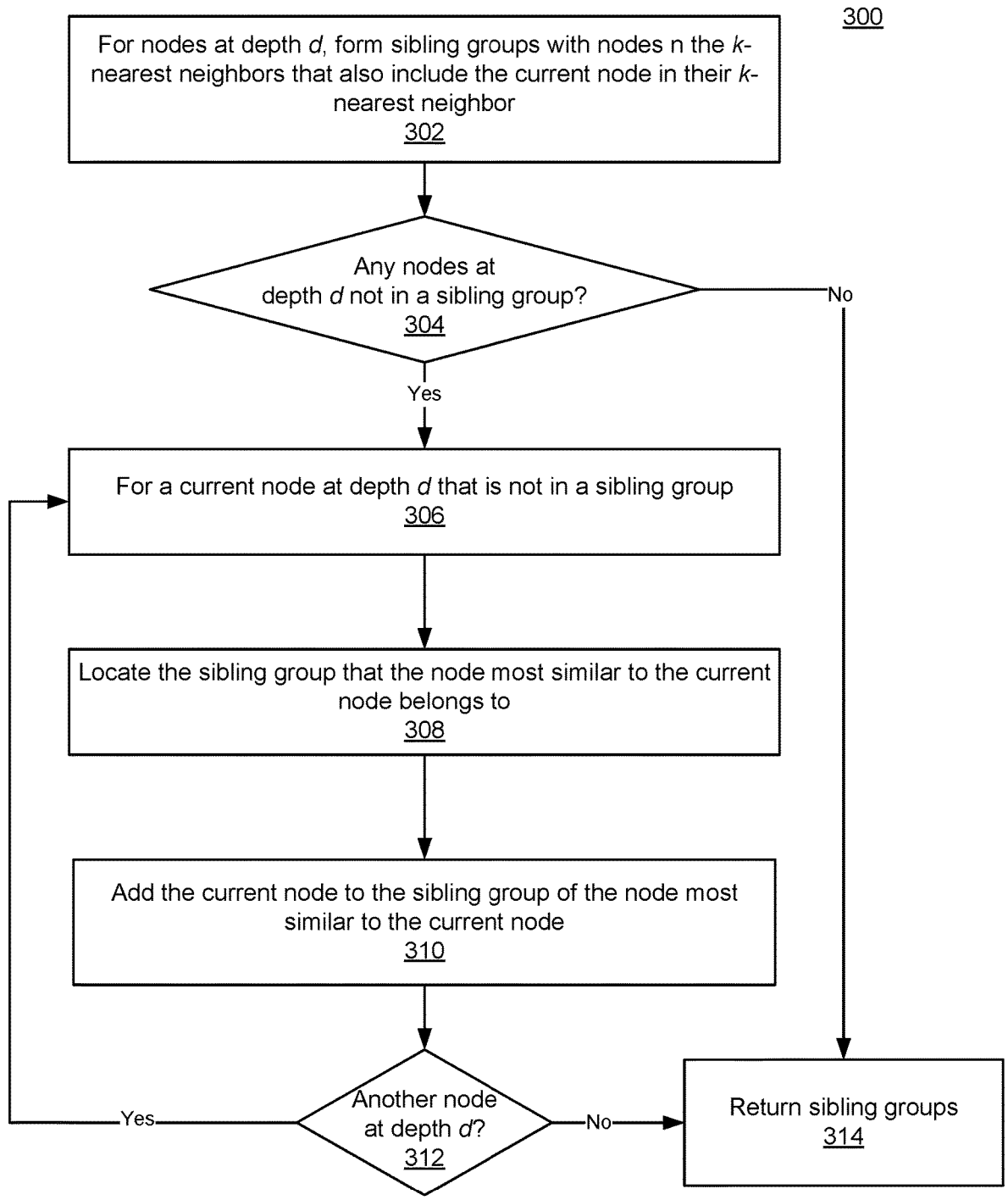
FIG. 3 is an example flowchart illustrating a process for identifying sibling groups, according to an implementation.

FIG. 3 is an example flowchart illustrating a process 300 for identifying sibling groups, according to an implementation. The process 300 may be performed by a system such as system 100 of FIG. 1, as part of step 208 of FIG. 2. Process 300 is an iterative process that identifies sibling groups for all nodes at depth d. It is understood that the depth d changes with each iteration of step 208. It is also understood that in some implementations sibling groups may be re-used. For example, if a node at depth 2 is included in a sibling group with a node at depth 3, then the sibling group may be reused when process 300 is run for nodes at depth 2 and need not be regenerated. In such implementations, only nodes at depth 2 that are not already in a sibling group will be analyzed as part of process 300.

Process 300 is performed for the nodes at depth d. The system generates sibling groups with mutual nearest neighbors, e.g., nodes in the k-nearest neighbors of the current node that also include the current node in their k-nearest neighbors (302). In some implementations, the sibling groups may have been formed in a previous iteration of process 300. In other words, sibling groups may be reused. The system may then determine whether there are any nodes at depth d that are not included in a sibling group (304). For example, node X is a non-mutual nearest neighbor of Y if X is not included in the k-nearest neighbors of Y but the k-nearest neighbors of X includes Y. In this scenario, X would not be included in a sibling group with Y as a result of step 302, and may not be included in any sibling group. If there is at least one node at depth d not in a sibling group (304, Yes), the system selects one of these nodes as the current node (306). The system may then determine which sibling group the node most similar to the current node is in (308). For example, using the scenario above, if node Y is the most similar to node X (i.e., is the top-scoring node in the k-nearest neighbors of X), the system will locate the sibling group that node Y is assigned to. The system then adds the current node to the sibling group of its nearest neighbor (310), e.g., X is added to the sibling group for Y. A node can only be assigned to one sibling group. The non-mutual neighbor is now considered a mutual nearest neighbor. If there are still nodes that do not have an assigned sibling group (312, Yes), the system moves to the next node at depth d that is not assigned to a sibling group, e.g., at step 306. If all nodes at depth d have been assigned to sibling groups (312, Yes), the sibling groups are formed and returned (316) and process 300 ends. If the number of nodes not assigned to a sibling group during step 302 is too large, the value of k may be increased. Increasing the value of k would include restarting the process that organizes hierarchical data according to node relatedness.

Figure 4:
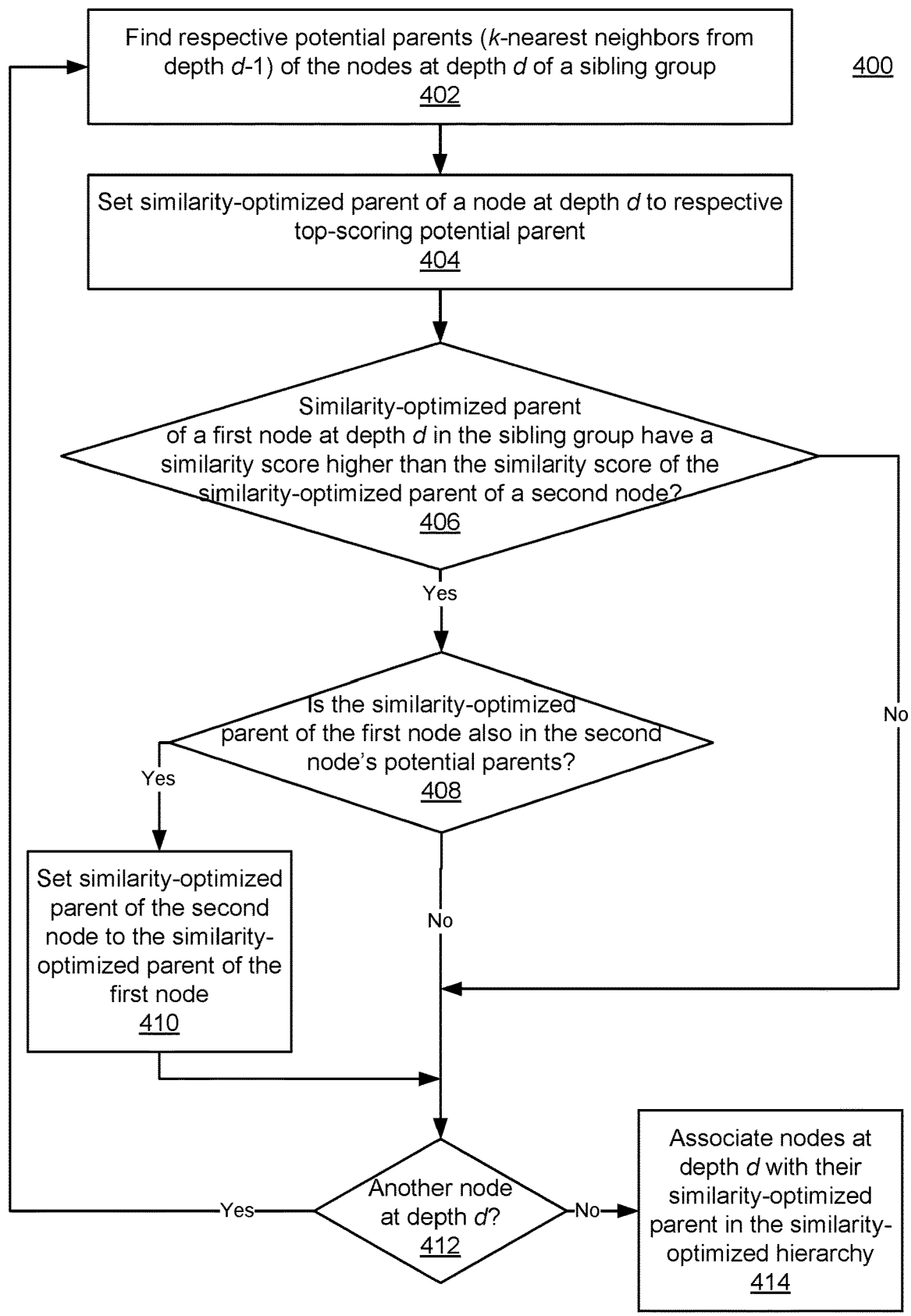
FIG. 4 is an example flowchart illustrating a process for identifying similarity parents, according to an implementation.

FIG. 4 is an example flowchart illustrating a process 400 for identifying similarity-optimized parent nodes, according to an implementation. The process 400 may be performed by a system such as system 100 of FIG. 1, as part of step 210 of FIG. 2. Process 400 is illustrated for a single sibling group. However it is understood that the system performs process 400 for all sibling groups, either in parallel or serially. Process 400 is one example of determining similarity-optimized parents.

Process 400 begins with determining, for each node at depth d, the potential parents of the node (402). The potential parents of a particular node at depth d are nodes at depth d−1 that are the k-nearest neighbors to the particular node. In other words, potential parents can only come from nodes at depth d−1, and the k-nearest neighbors for potential parents are selected from this group of nodes. The value of k is a non-zero integer. In some implementations, the value of k may be the same as the value used to determine sibling groups. In some implementations, the value of k may be larger than the value of k used to determine sibling groups. The system initially sets the similarity-optimized parent of each node to the top-scoring node in the potential parents (404). Put another way, the system initializes the similarity-optimized parent of a node at depth d to the node at depth d−1 most similar to the node, based on the similarity metric (or combination of metrics) used to generate sibling groups. The system may change the similarity-optimized parent of a node based on other nodes in the sibling group. This may occur, for example, when one node is highly similar to its top-scoring potential parent and one or more other nodes in the sibling group have that same potential parent, even if it is not the top-scoring potential parent.

Put another way, the system may determine whether a first node at depth d in the sibling group is more similar to its similarity-optimized parent than a second node at depth d is to its current similarity-optimized parent (406). If this is true (406, Yes), the system may determine whether the similarity-optimized parent of the first node is also in the potential parents of the second node (408). If this is true (408, Yes), the system changes the similarity-optimized parent of the second node to the similarity-optimized parent of the first node (410). This increases the branching factor of the similarity-optimized hierarchy by ensuring that the first node and the second node at depth d will have the same parent in the similarity-optimized hierarchy. A simple example of steps 406 to 410 follows. If 1) node A has X as its similarity-optimized parent, 2) node B has Y as its similarity-optimized parent, 3) node B is more similar to node Y than node A is to node X, and 4) node Y is included in the potential parents of node A, then the system changes the similarity-optimized parent of node A from X to Y. In this manner, determining the similarity-optimized parent for a node is influenced by other nodes in the sibling group. The similarity-optimized parent for a node is thus either the node from depth d−1 most similar to the node or most similar to a node in the sibling group.

The system performs steps 406 to 410, as applicable, for all the nodes at depth d in the sibling group (412). When every node at depth d has been assigned a similarity-optimized parent (412, No), the system associates the nodes with their similarity-optimized parent in the similarity-optimized hierarchy (414). Process 400 then ends, although it is understood that the system performs process 400 for each sibling group.

Figure 5A:
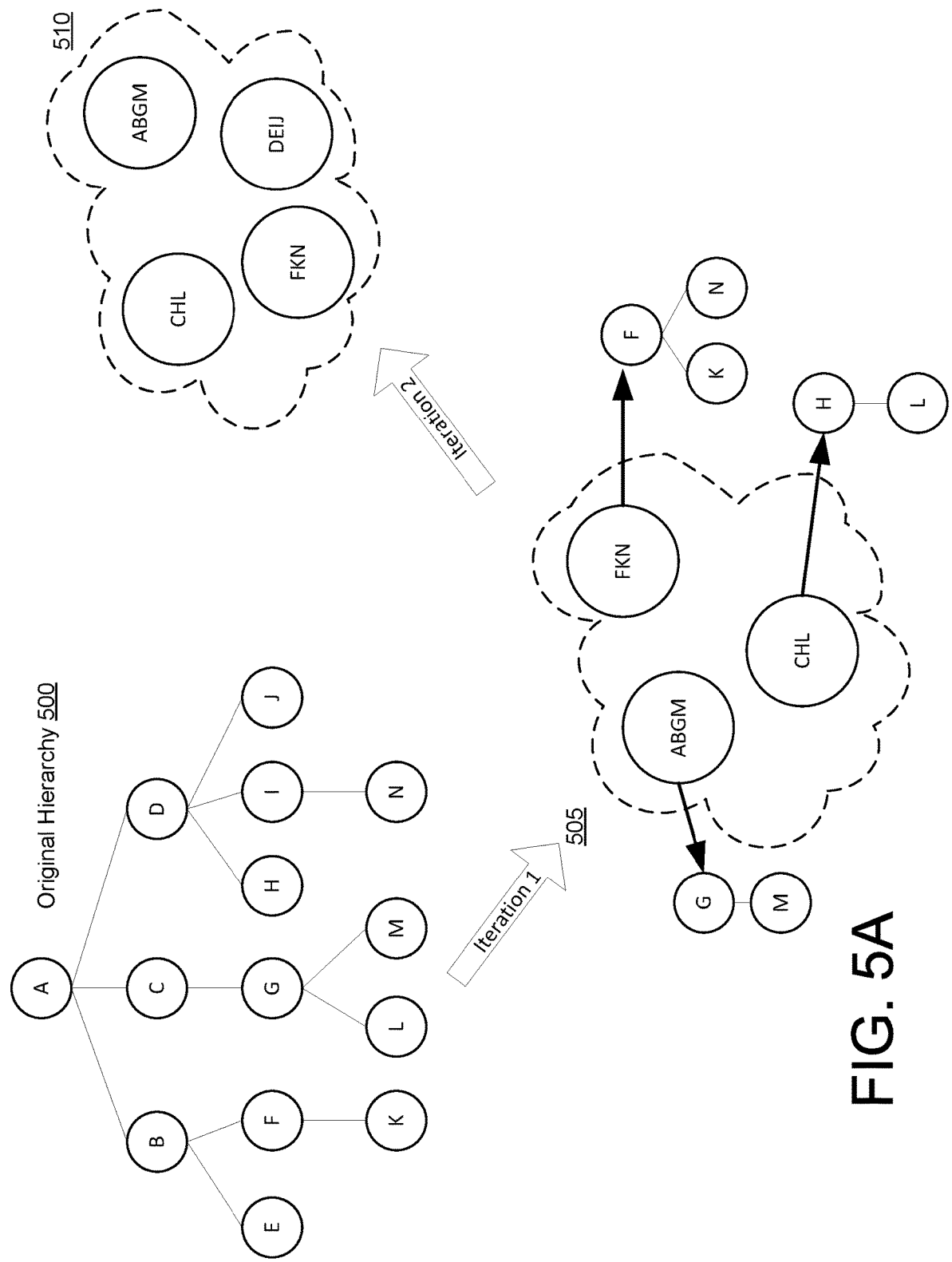
FIGS. 5A and 5B illustrate an example of an original hierarchy reorganized according to node relatedness, according to an implementation.
Figure 5B:
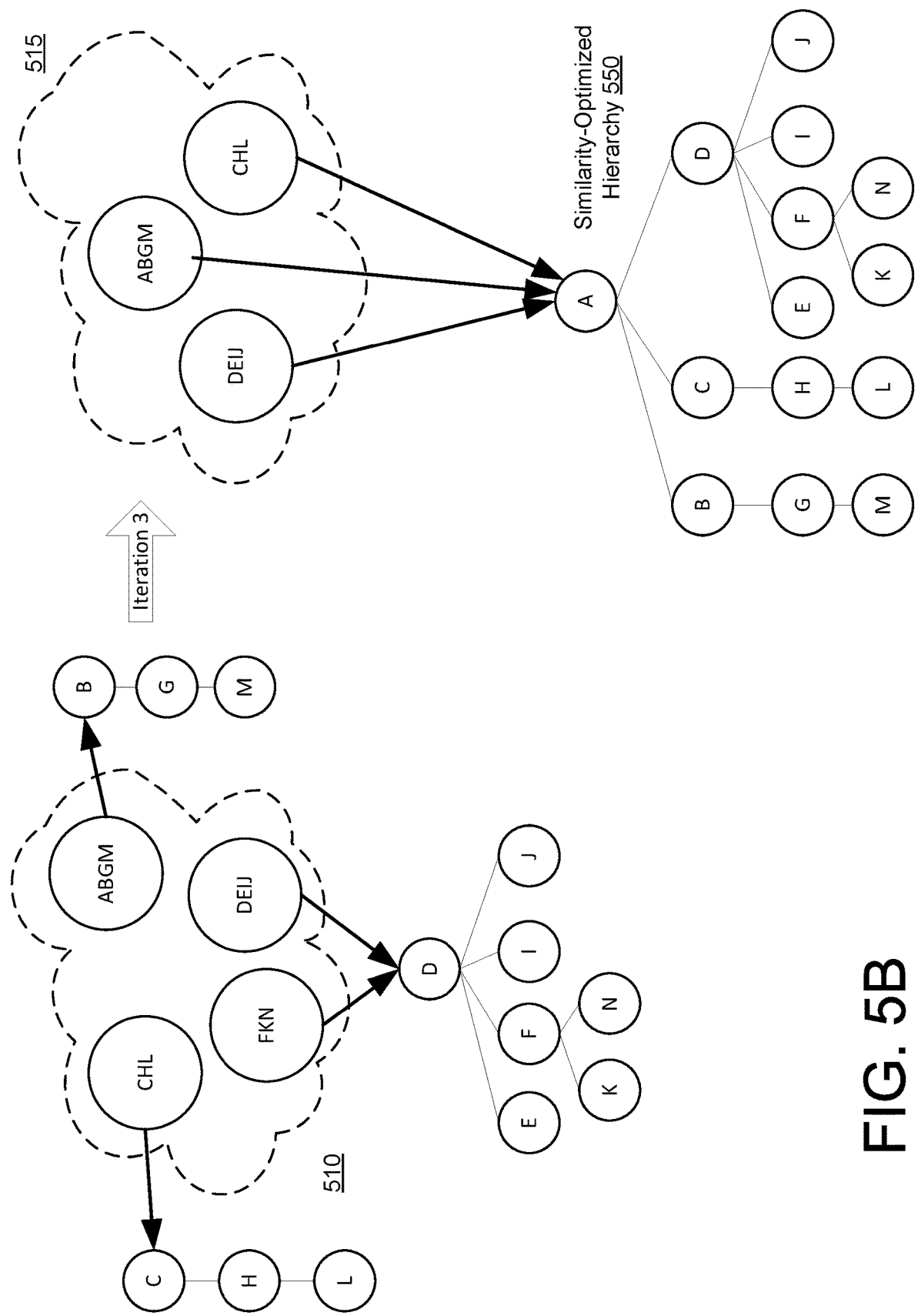

FIGS. 5A and 5B illustrate a simple original hierarchy 500 that is according to node relatedness, according to an implementation. The original hierarchy 500 has four levels and a depth of 3 for ease of explanation. Implementations are understood to operate in a similar manner on much larger and complex hierarchies. The original hierarchy 500 includes leaf nodes E, H, J, K, L, M, and N and root node A. The leaf nodes K, L, M, and N are at depth 3 and the leaf nodes E, H, and J are at depth 2. The system first generates (Iteration 1) sibling groups 505 for the leaf nodes at depth 3. In the example of FIG. 5A, sibling groups 505 include three sibling groups with the nodes as illustrated. Because sibling groups are mutual nearest neighbors two groups only include three siblings. Also as illustrated, the sibling groups each have at least one node from depth 3, but include nodes from other levels. Thus FIG. 5A demonstrates that the sibling groups 505 are formed without regard to node depth.

From the sibling group that includes nodes A, B, G, and M, node M is the only node from depth 3, so the system determines its similarity-optimized parent as node G. In other words, node M is more similar to node G than any other node at depth 2. Likewise, the system determines that nodes K and N are more similar to node F at depth 2 than any other node at depth 2. Finally, the system determines that node L is more similar to node H at depth 2 than any other node at depth 2 and assigns node H as the similarity-optimized parent of node L. Note that node H in the original hierarchy is a leaf node (has no children), but in the similarity-optimized hierarchy node H is no longer a leaf node.

Having assigned all nodes at depth 3 a similarity-optimized parent, the system generates (Iteration 2) sibling groups 510 for nodes at depth 2. Sibling groups 510 include a new sibling group of nodes D, E, I, and J, which has nodes I and J at depth 2. As illustrated in FIG. 5B, the system identifies the similarity-optimized parent of each node at depth 2. For example, node H, which has been assigned a child in the similarity-optimized hierarchy, is assigned node C as its similarity-optimized parent in the similarity-optimized hierarchy. Likewise, Node F from the sibling group FKN and nodes E, I, and J, are assigned node D as the similarity-optimized parent. The system assigns node B as the similarity-optimized parent of node G.

The system has organized the lowest two levels of the similarity-optimized hierarchy and moves to the nodes at depth 1 (Iteration 3). For the nodes at depth 1, the system generates sibling groups 515. Each sibling group 515 includes a node at depth 1. The system then identifies the similarity-optimized parent of the nodes at depth 1. Because the nodes are at depth 1, the only possible parent is node A, the root node. Accordingly, once the similarity-optimized parent is assigned, the system has fully generated the similarity-optimized hierarchy 550. The result of this process is similarity-optimized hierarchy 550.

FIGS. 5A and 5B illustrate how distant nodes in the original hierarchy 500 become siblings in the similarity-optimized hierarchy 550. For example, nodes K and N are siblings in hierarchy 550, where in the original hierarchy 500 they are in distant subtrees, e.g., at a distance of six (6). A user trying to identify similar data would need to traverse six arcs in the original hierarchy 500 to locate node N from node K, which is highly inefficient and ineffective. Moreover, the data represented by nodes K and N are not likely to be stored in proximity to each other in physical memory under the original hierarchy 500, so if K and N are both responsive to the same query (which is likely given their semantic similarity), the computer system would need to perform two read operations to access the data. In contrast, when the data is stored according to the similarity-optimized hierarchy 550, the data represented by nodes K and N are highly likely to be stored proximately, reducing the read operations from two to one. Moreover, a user trying to discover similar data is presented with nodes K and N together while traversing the similarity-optimized hierarchy 550.

Implementations of the various techniques described herein may be implemented in digital electronic circuitry, or in computer hardware, firmware, software, or in combinations of them. Implementations may be implemented as a computer program product, i.e., a computer program tangibly embodied in an information carrier, e.g., in a machine-readable storage device, for execution by, or to control the operation of, data processing apparatus, e.g., a programmable processor, a computer, or multiple computers. A computer program, such as the computer program(s) described above, can be written in any form of programming language, including compiled or interpreted languages, and can be deployed in any form, including as a stand-alone program or as a module, component, subroutine, or other unit suitable for use in a computing environment. A computer program can be deployed to be executed on one computer or on multiple computers at one site or distributed across multiple sites and interconnected by a communication network.

Method steps may be performed by one or more programmable processors executing a computer program to perform functions by operating on input data and generating output. Method steps also may be performed by, and an apparatus may be implemented as, special purpose logic circuitry, e.g., an FPGA (field programmable gate array) or an ASIC (application-specific integrated circuit). Method steps may also be performed in a different order than illustrated in the figures.

Processors suitable for the execution of a computer program include, by way of example, both general and special purpose microprocessors, and any one or more processors of any kind of digital computer. Generally, a processor will receive instructions and data from a read-only memory or a random access memory or both. Elements of a computer may include at least one processor for executing instructions and one or more memory devices for storing instructions and data. Generally, a computer also may include, or be operatively coupled to receive data from or transfer data to, or both, one or more mass storage devices for storing data, e.g., magnetic, magneto-optical disks, or optical disks. Information carriers suitable for embodying computer program instructions and data include all forms of non-volatile memory, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory may be supplemented by, or incorporated in special purpose logic circuitry.

To provide for interaction with a user, implementations may be implemented on a computer having a display device, e.g., a cathode ray tube (CRT) or liquid crystal display (LCD) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

Implementations may be implemented in a computing system that includes a back-end component, e.g., as a data server, or that includes a middleware component, e.g., an application server, or that includes a front-end component, e.g., a client computer having a graphical user interface or a Web browser through which a user can interact with an implementation, or any combination of such back-end, middleware, or front-end components. Components may be interconnected by any form or medium of digital data communication, e.g., a communication network. Examples of communication networks include a local area network (LAN) and a wide area network (WAN), e.g., the Internet.

While certain features of the described implementations have been illustrated as described herein, many modifications, substitutions, changes, and equivalents will now occur to those skilled in the art. It is, therefore, to be understood that the appended claims are intended to cover all such modifications and changes as fall within the scope of the embodiments.

According to one general aspect a computer-implemented method for storing hierarchical data in memory based on similarity includes generating, by at least one processor, a respective embedding for each node of a plurality of nodes representing hierarchical data having an original hierarchy of depth of d, determining, by the at least one processor and for each node of the plurality of nodes, respective k-nearest neighbors based on the embeddings. Starting with nodes at the depth d in the original hierarchy, the method further includes generating sibling groups, each sibling group having at least one node at depth d, the sibling groups being mutual k-nearest neighbors, identifying, for each node at depth d, a similarity-optimized parent from depth d−1, and associating each node at depth d with its respective similarity-optimized parent in a similarity-optimized hierarchy. The method also includes completing, by the at least one processor, the similarity-optimized hierarchy by repeating, with nodes at decreasing depths until reaching a root of the hierarchy, the generating, identifying, and associating and storing the hierarchical data according to the similarity-optimized hierarchy in memory.

These and other aspects can include one or more of the following features, alone or in combination. For example, identifying the similarity-optimized parent for a node at depth d can include identifying a node at depth d−1 in the original hierarchy that is most similar to the node. As another example, identifying, for each node at depth d, the similarity-optimized parent can include determining respective potential parents for each node at depth d, where potential parents are the k-nearest neighbors of the node from the nodes at depth d−1, for each node at depth d, assigning the top-scoring node from the potential parents as the similarity-optimized parent, and for each sibling group: identifying a first parent node common to the potential parents of at least a first node in the sibling group and the potential parents of a second node in the sibling group, determining that the first parent node is more similar to the first node than the second node is to its similarity-optimized parent, and assigning the first parent node to the second node as its similarity-optimized parent.

As another example, the method may also include preserving a view of the original hierarchy, using the similarity-optimized hierarchy for navigation of the hierarchical data, and/or using the similarity-optimized hierarchy to identify related hierarchical data based on similarity. As another example, the embeddings may be in hyperbolic space. As another example, the value of k may be based on an effective branching factor of the original hierarchy. As another example, the method may also include receiving a query and accessing nodes of the hierarchy that are responsive to the query via the memory, wherein at least two of the nodes responsive to the query are siblings in the similarity-optimized hierarchy and in different subtrees in the original hierarchy.

According to one general aspect, a computer system for storing hierarchical data based on similarity includes a memory storing instructions, at least one memory storing hierarchical data in an original hierarchy, the original hierarchy having a plurality of nodes and a depth of d, and at least one processor that is operably coupled to the memory storing instructions and that is arranged and configured to execute the instructions to cause the at least one processor to implement an application, the application comprising a hierarchy optimization engine. The hierarchy optimization engine may be arranged and configured to generate a respective embedding for each node of the plurality of nodes and determine, for each node of the plurality of nodes, respective k-nearest neighbors based on the respective embedding. The hierarchy optimization engine may be further arranged and configured to generate a similarity-optimized hierarchy for the hierarchical data by iteratively, starting from nodes at depth d in the original hierarchy, and moving up the original hierarchy to a root of the hierarchy, repeating the operations of generating sibling groups, each sibling group having at least one node at depth d, identifying, for each node at depth d, a similarity-optimized parent from depth d−1, and associating each node at depth d with its respective similarity-optimized parent in the similarity-optimized hierarchy. The hierarchy optimization engine may be further arranged and configured to reorganize the hierarchical data in the at least one memory according to the similarity-optimized hierarchy, so that siblings at depth d are adjacent in the at least one memory.

These and other aspects can include one or more of the following features, along or in combination. For example, the hierarchy optimization engine may be further arranged and configured to receive the hierarchical data from a requesting process and store the hierarchical data in the at least one memory. In some implementations, the hierarchy optimization engine may be further arranged and configured to provide the reorganized hierarchical data to the requesting process. As another example, generating the sibling groups can include forming a sibling group from nodes that include each other in respective k-nearest neighbors. In some implementations, generating the sibling groups can further include determining that another node not in the sibling group has as its nearest neighbor a node in the sibling group and, responsive to the determining, adding the other node to the sibling group. As another example, identifying the similarity-optimized parent for a node at depth d can include identifying a node at depth d−1 in the original hierarchy that is most similar to the node. As another example, identifying, for each node at depth d, the similarity-optimized parent can include determining respective potential parents for each node at depth d, where potential parents are the k-nearest neighbors of the node from the nodes at depth d−1 and, for each node at depth d, assigning the top-scoring node from the potential parents as the similarity-optimized parent and, for each sibling group: identifying a first parent node common to the potential parents of at least a first node in the sibling group and the potential parents of a second node in the sibling group, determining that the first parent node is more similar to the first node than the second node is to its similarity-optimized parent, and assigning the first parent node to the second node as its similarity-optimized parent.

According to one general aspect, a computer program product for generating a similarity-optimized hierarchy for hierarchical data is disclosed. The computer program product may be tangibly embodied on a non-transitory computer-readable storage medium and comprise instructions that, when executed by at least one computing device, are configured to cause the at least one computing device to receive, from a requesting process, hierarchical data in an original hierarchy, the original hierarchy having a plurality of nodes and a depth of d, generate a respective embedding for each node of the plurality of nodes, and determine, for each node of the plurality of nodes, respective k-nearest neighbors based on the respective embedding. Starting with nodes at depth d in the original hierarchy the instructions may be configured to cause the at least one computing device to generate sibling groups, each sibling group having at least one node at depth d, identify, for each node at depth d, a similarity-optimized parent from depth d−1, and associate each node at depth d with its respective similarity-optimized parent in a similarity-optimized hierarchy. The instructions may be configured to cause the at least one computing device to complete the similarity-optimized hierarchy by repeating, with nodes at depth d−1 until reaching a root of the hierarchy, the generating, identifying, and associating and provide, via a network, the similarity-optimized hierarchy to the requesting process.

These and other aspects can include one or more of the following features, alone or in combination. For example, receiving the hierarchical data can include receiving a location of the data. In some implementations, providing the similarity-optimized hierarchy includes reorganizing the hierarchical data at the location. As another example, providing the similarity-optimized hierarchy can include providing a reorganized copy of the hierarchical data to the requesting process. As another example, providing the similarity-optimized hierarchy can include providing a view of the hierarchical data to the requesting process.

According to one general aspect, a system includes at least one processor and memory storing instructions that, when executed by the at least one processor, cause the system to perform any of the operations or methods disclosed herein.

What is claimed is:
1. A computer-implemented method for storing hierarchical data in memory based on similarity comprising:
   receiving hierarchical data from a requesting process;
   generating, by at least one processor, a respective embedding for each node of a plurality of nodes representing the hierarchical data having an original hierarchy of depth of d, wherein d is an integer;
   determining, by the at least one processor and for each node of the plurality of nodes, respective k-nearest neighbors based on the embeddings;
   starting with nodes at the depth d in the original hierarchy:
      generating sibling groups, each sibling group having at least one node at depth d, the sibling groups being mutual k-nearest neighbors,
      identifying, for each node at depth d, a similarity-optimized parent from depth d−1, and
      associating each node at depth d with its respective similarity-optimized parent in a similarity-optimized hierarchy, wherein the similarity-optimized hierarchy comprises a reorganization of the original hierarchy;

completing, by the at least one processor, the similarity-optimized hierarchy by repeating, with nodes at decreasing depths until reaching a root of the original hierarchy, the generating sibling groups, identifying, and associating; and storing the hierarchical data according to the similarity-optimized hierarchy in the memory, by storing leaf nodes that are siblings in the similarity-optimized hierarchy in proximity to each other in the memory.

2. The method of claim 1, wherein identifying the similarity-optimized parent for a node at depth d includes:

identifying a node at depth d−1 in the original hierarchy that is most similar to the node at depth $d$.

3. The method of claim 1, wherein identifying, for each node at depth d, the similarity-optimized parent includes:

determining respective potential parents for each node at depth d, where potential parents are the k-nearest neighbors of the node from nodes at depth d−1;

for each node at depth d, assigning a top-scoring node from the potential parents as the similarity-optimized parent; and for each sibling group:
identifying a first parent node common to the potential parents of at least a first node in the sibling group and the potential parents of a second node in the sibling group, determining that the first parent node is more similar to the first node than the second node is to its similarity-optimized parent, and assigning the first parent node to the second node as its similarity-optimized parent.

4. The method of claim 1, further comprising: preserving a view of the original hierarchy.

5. The method of claim 1, further comprising: using the similarity-optimized hierarchy for navigation of the hierarchical data.

6. The method of claim 1, further comprising: using the similarity-optimized hierarchy to identify related hierarchical data based on similarity.

7. The method of claim 1, wherein the embeddings are in hyperbolic space.

8. The method of claim 1, further comprising:
receiving a query; and
accessing nodes of the original hierarchy that are responsive to the query via the memory, wherein at least two of the nodes responsive to the query are siblings in the similarity-optimized hierarchy and in different subtrees in the original hierarchy.

9. A computer system for storing hierarchical data based on similarity, the computer system comprising:
a memory storing instructions;
at least one memory storing hierarchical data in an original hierarchy, the original hierarchy having a plurality of nodes and a depth of d; and at least one processor that is operably coupled to the memory storing instructions and that is arranged and configured to execute the instructions to cause the at least one processor to implement an application, the application comprising:
a hierarchy optimization engine that is arranged and configured to:
receiving the hierarchical data from a requesting process;

generate a respective embedding for each node of the plurality of nodes;

determine, for each node of the plurality of nodes, respective k-nearest neighbors based on the respective embedding;

generate a similarity-optimized hierarchy for the hierarchical data by iteratively, starting from nodes at depth d in the original hierarchy, wherein d is an integer, and moving up the original hierarchy to a root of the original hierarchy, repeating operations of:

generating sibling groups, each sibling group having at least one node at depth d, identifying, for each node at depth d, a similarity-optimized parent from depth d−1, and associating each node at depth d with its respective similarity-optimized parent in the similarity-optimized hierarchy, wherein the similarity-optimized hierarchy comprises a reorganization of the original hierarchy;

reorganize the hierarchical data in the at least one memory according to the similarity-optimized hierarchy, so that siblings at depth d are adjacent in the at least one memory; and store the hierarchical data according to the similarity-optimized hierarchy in the at least one memory, by storing leaf nodes that are siblings in the similarity-optimized hierarchy in proximity to each other in the at least one memory.

10. The system of claim 9, wherein the hierarchy optimization engine is further arranged and configured to: provide the reorganized hierarchical data to the requesting process.

11. The system of claim 9, wherein generating the sibling groups include:
forming a sibling group from nodes that include each other in respective k-nearest neighbors.

12. The system of claim 11, wherein generating the sibling groups further includes:
deciding that another node not in the sibling group has as its nearest neighbor a node in the sibling group; and
responsive to the deciding, adding the other node to the sibling group.

13. The system of claim 9, wherein identifying the similarity-optimized parent for a node at depth d includes:
identifying a node at depth d−1 in the original hierarchy that is most similar to the node at depth $d$.

14. The system of claim 9, wherein identifying, for each node at depth d, the similarity-optimized parent includes:
determining respective potential parents for each node at depth d, where potential parents are the k-nearest neighbors of the node from nodes at depth d−1;

for each node at depth d, assigning a top-scoring node from the potential parents as the similarity-optimized parent; and for each sibling group:
identifying a first parent node common to the potential parents of at least a first node in the sibling group and the potential parents of a second node in the sibling group, determining that the first parent node is more similar to the first node than the second node is to its similarity-optimized parent, and assigning the first parent node to the second node as its similarity-optimized parent.

15. A computer program product for generating a similarity-optimized hierarchy for hierarchical data, the computer program product being tangibly embodied on a non-transitory computer-readable storage medium and comprising instructions that, when executed by at least one computing device, are configured to cause the at least one computing device to:

receive, from a requesting process, hierarchical data stored in memory in an original hierarchy, the original hierarchy having a plurality of nodes and a depth of d, wherein d is an integer;

generate a respective embedding for each node of the plurality of nodes;

determine, for each node of the plurality of nodes, respective k-nearest neighbors based on the respective embedding;

starting with nodes at depth d in the original hierarchy:
generate sibling groups, each sibling group having at least one node at depth d,
identify, for each node at depth d, a similarity-optimized parent from depth d−1, and
associate each node at depth d with its respective similarity-optimized parent in a similarity-optimized hierarchy, wherein the similarity-optimized hierarchy comprises a reorganization of the original hierarchy;

complete the similarity-optimized hierarchy by repeating, with nodes at depth d−1 until reaching a root of the original hierarchy, the generating sibling groups, identifying, and associating;

store the hierarchical data according to the similarity-optimized hierarchy in the memory, by storing leaf nodes that are siblings in the similarity-optimized hierarchy in proximity to each other in the memory; and provide, via a network, the similarity-optimized hierarchy to the requesting process.

16. The computer program product of claim 15, wherein receiving the hierarchical data includes receiving a location of the hierarchical data.

17. The computer program product of claim 16, wherein providing the similarity-optimized hierarchy includes reorganizing the hierarchical data at the location.

18. The computer program product of claim 15, wherein providing the similarity-optimized hierarchy includes providing a reorganized copy of the hierarchical data to the requesting process.

19. The computer program product of claim 15, wherein providing the similarity-optimized hierarchy includes providing a view of the hierarchical data to the requesting process.

* * * * *